(12) United States Patent  
Hsue

(10) Patent No.: US 6,657,868 B1
(45) Date of Patent: Dec. 2, 2003

(54) ELECTRONIC DEVICE MOUNT ASSEMBLY

(75) Inventor: Eugene Yan Ki Hsue, San Jose, CA (US)

(73) Assignee: 3PARdata, Inc., Fremont, CA (US)

( * ) Notice: Subject to any disclaimer, the term of this patent is extended or adjusted under 35 U.S.C. 154(b) by 0 days.

(21) Appl. No.: 09/990,106

(22) Filed: Nov. 21, 2001

(51) Int. Cl.$^7$ ................................................ H05K 7/00
(52) U.S. Cl. .................. 361/728; 361/725; 361/685; 361/686; 361/825; 174/138 G
(58) Field of Search ................................ 361/728, 725, 361/752, 679, 683, 685, 684, 804, 810, 825, 680, 686; 174/138 G

(56) References Cited

U.S. PATENT DOCUMENTS

| | | | | |
|---|---|---|---|---|
| 5,333,098 A | * | 7/1994 | DeLuca et al. | 248/632 |
| 5,337,998 A | * | 8/1994 | Nemoto | 248/634 |
| 5,398,157 A | * | 3/1995 | Paul | 361/684 |
| 5,566,049 A | * | 10/1996 | Nguyen | 248/221.11 |
| 5,608,611 A | * | 3/1997 | Szudarek et al. | 174/138 G |
| 6,227,631 B1 | * | 5/2001 | Lin et al. | 312/223.2 |
| 6,285,548 B1 | * | 9/2001 | Hamlet et al. | 174/15.1 |
| 6,317,318 B1 | * | 11/2001 | Kim | 361/685 |
| 6,327,147 B1 | * | 12/2001 | Llapitan et al. | 361/704 |

* cited by examiner

Primary Examiner—David Martin
Assistant Examiner—Hung Bui
(74) Attorney, Agent, or Firm—Patent Law Group LLP; David C. Hsia

(57) ABSTRACT

An electronic device mount assembly is disclosed for permitting an electronic device to be mounted within an enclosure. In one embodiment, the electronic device mount assembly includes a pair of braces operable to be secured to opposing sides of an electronic device mount assembly. Each of the braces having at least one fastener mounted thereon. A base member is also disclosed that includes raised connection assemblies operable to receive the fasteners of the first pair of braces, for securing the electronic device to the base member.

25 Claims, 5 Drawing Sheets

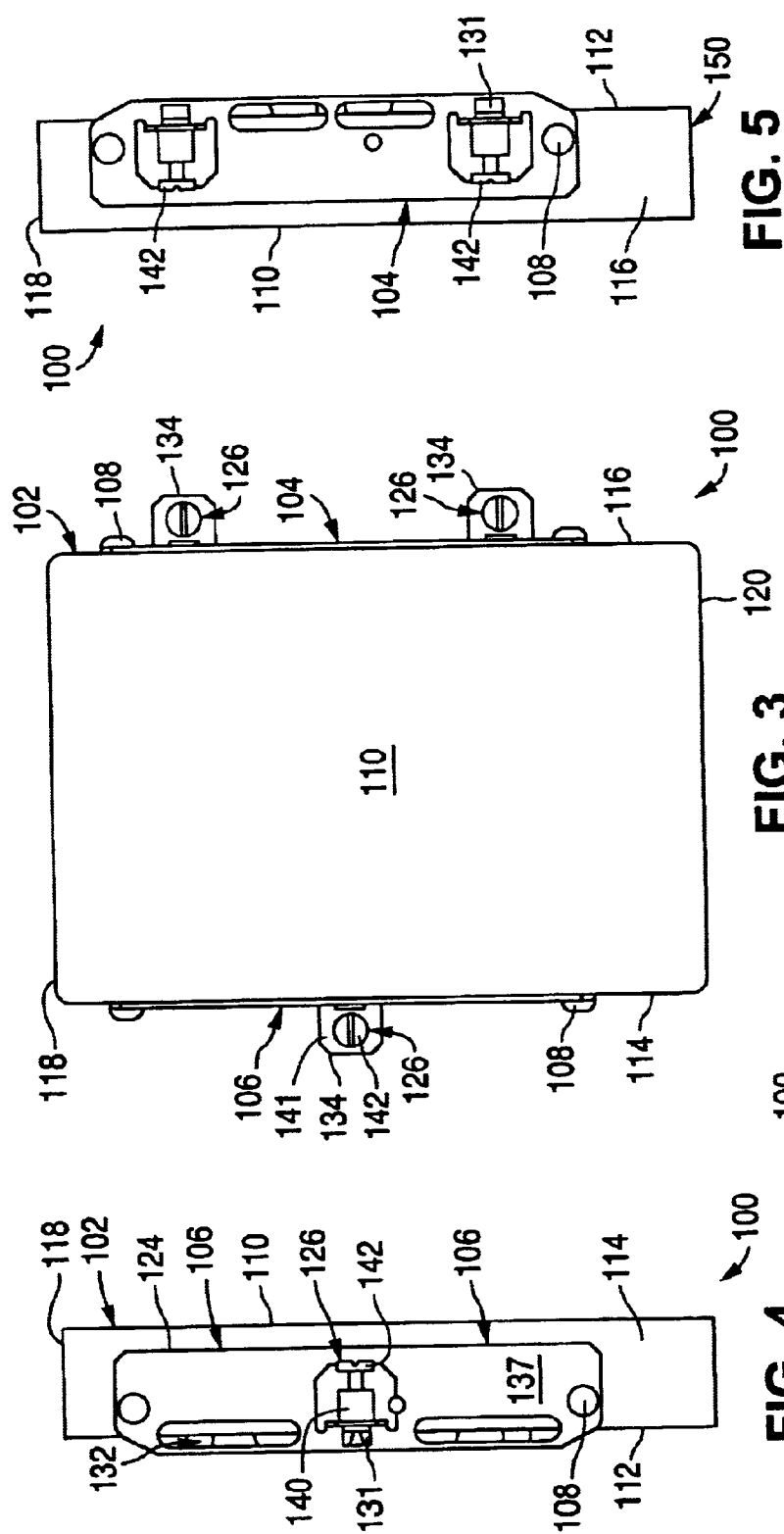

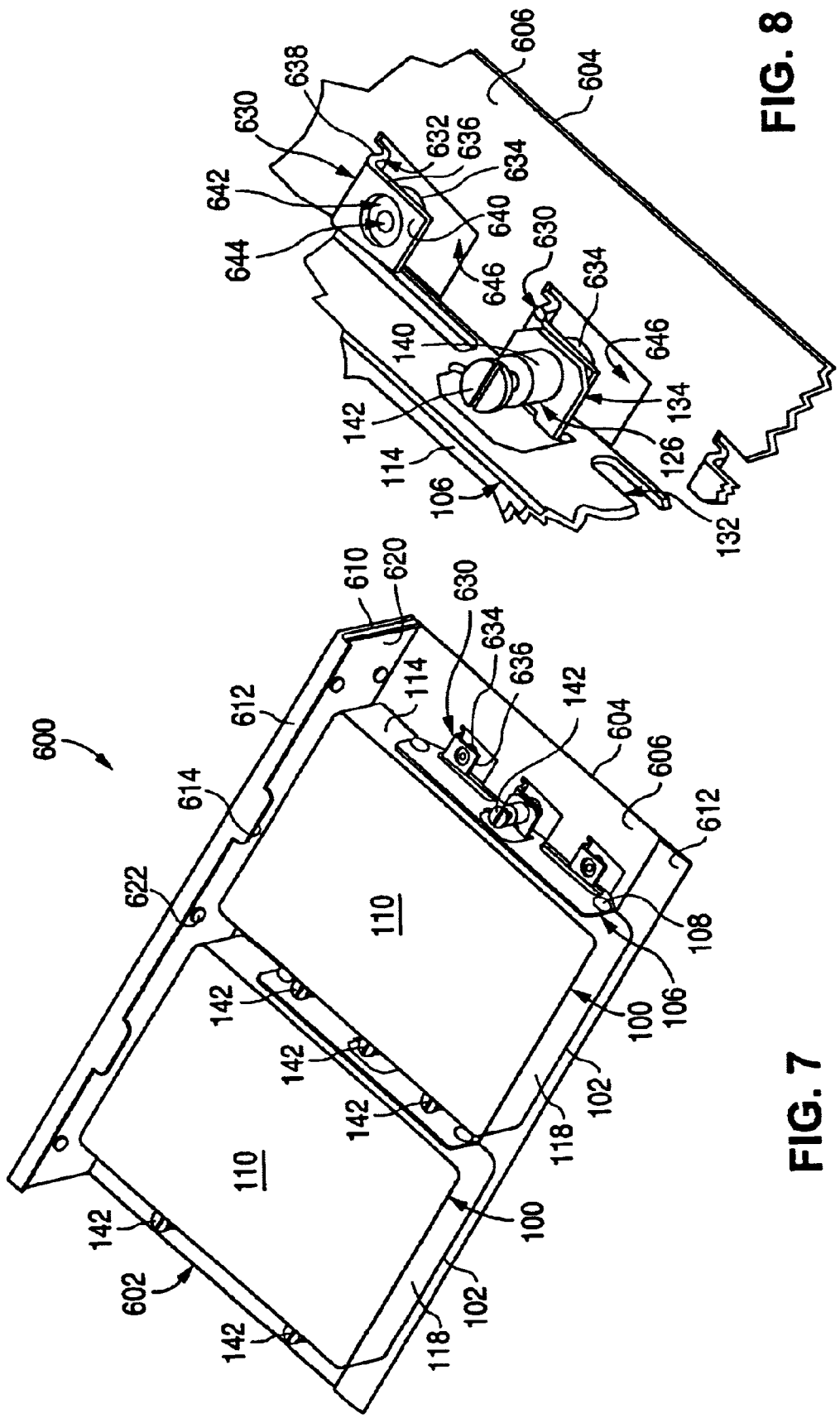

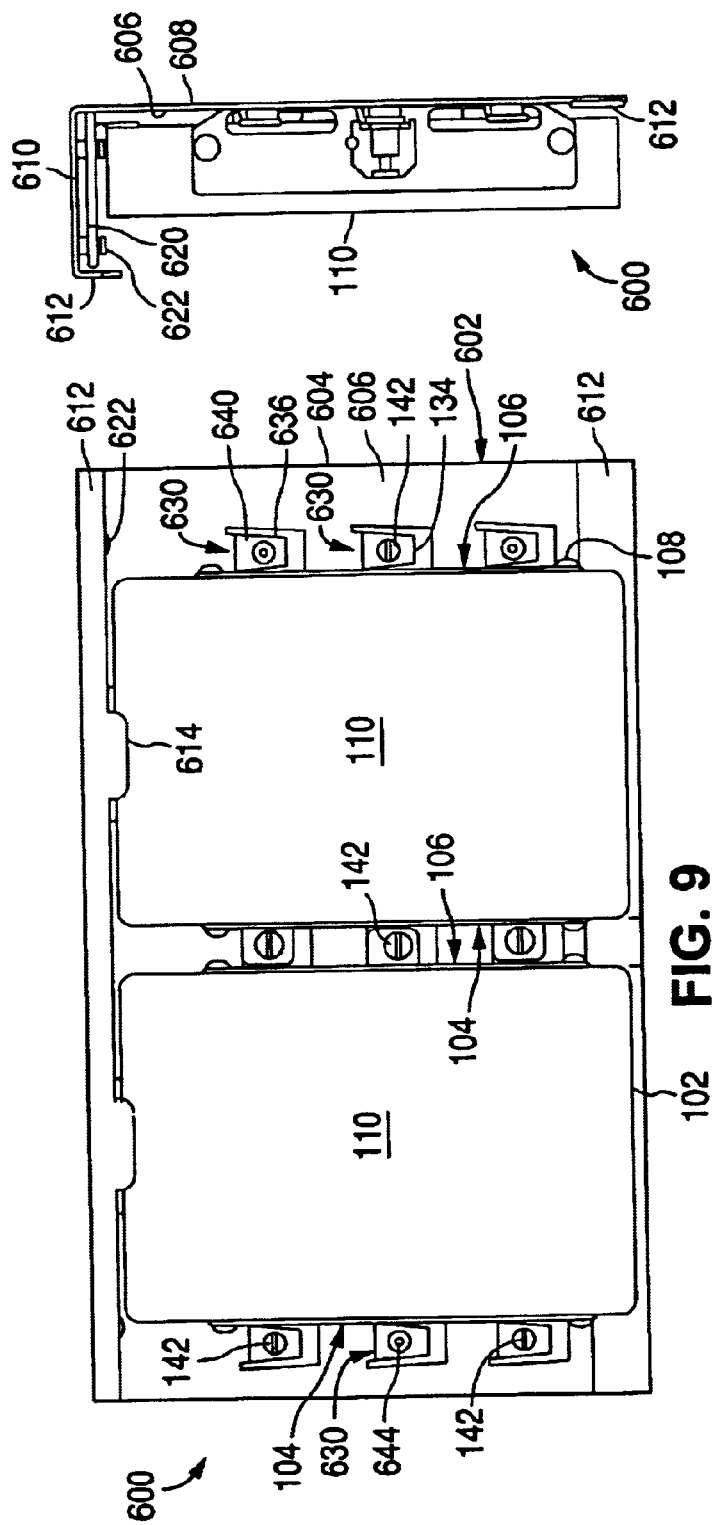
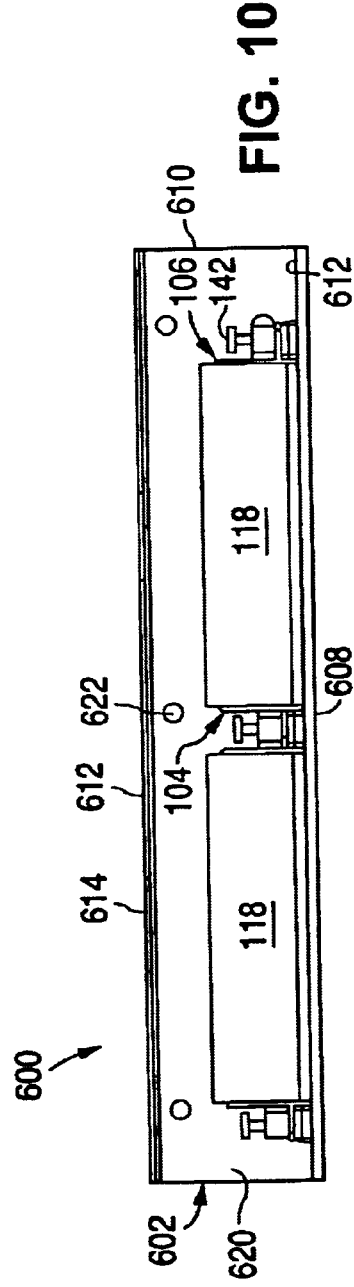

ELECTRONIC DEVICE MOUNT ASSEMBLY

TECHNICAL FIELD

The present invention relates to mount assemblies, and more particularly to a mount assembly for securing electronic devices within a common enclosure.

BACKGROUND

With advancements in data communications and computing technologies, ever-increasing numbers of electronic devices need to be housed. These electronic devices may include, for example, data storage devices, data processing devices, and the like. CD-ROM drives, floppy disk drives, optical disk drives, and high-density disk drives are examples of various data storage devices that are currently available.

Because electronic devices, such as data storage devices, may wear out or malfunction, in certain computing systems, it is desirable to house such devices such that they are easily removable, replaceable, or both. For example, removable high-density disk drives are currently utilized to store large quantities of information. Most high-density disk drives, however, are enclosed within systems that do not provide easy access to individual drives. That is, to remove one drive, one or more other drives may need to be removed or disturbed.

In an environment where it is necessary to frequently access the housed electronic devices, such as for repair or replacement, ready access to the electronic devices in an efficient and reliable fashion is desirable. Some electronic devices, such as data storage devices, may frequently need to be replaced or removed from a housing or other enclosure.

Further, where a large number of electronic devices are mounted within a common enclosure, it is desirable to minimize the number of electronic devices that must be physically disturbed, when replacing, or accessing, one or more of the electronic devices within the enclosure. To save space, it is also desirable to maximize the number of electronic devices that can be mounted within a common enclosure.

Some electronic devices, such as data storage devices, are sensitive to vibrations, such as rotational vibrations. Such vibrations may impair the performance of the electronic devices and can cause the electronic devices to malfunction.

SUMMARY

According to some embodiments of the present invention, an electronic device mount assembly is disclosed for permitting an electronic device to be mounted within an enclosure. In one embodiment, the electronic device mount assembly includes a pair of braces operable to be secured to opposing sides of an electronic device. Each of the braces has at least one fastener mounted thereon. A base member is also disclosed that includes raised connection assemblies operable to receive the fasteners of the braces, for securing the electronic device to the base member. The fasteners may comprise captive fasteners.

In one embodiment, an electronic device assembly includes a first brace operable to be secured to the first side of an electronic device and a second brace operable to be secured to a second side of the electronic device. Each of the braces has at least one arm extending away from the electronic device. A captive fastener is mounted on each arm for securing the associated brace to an enclosure. Each arm may be oriented substantially orthogonal, or perpendicular, to the first and second sides of the electronic device and may be formed integrally with the associated brace. The captive fastener may comprise, for example, a threaded fastener held captive within a boss secured to the associated arm.

In one embodiment, multiple electronic device assemblies are mounted on a common enclosure. The enclosure may include a base member having a first surface and a wall formed thereon, the wall being oriented orthogonal to the first surface of the base member. Adapters, such as SCA adapters, are attached to the wall for connecting to electronic devices mounted on the enclosure.

In some embodiments, raised connection assemblies are disposed on the base member for securing one or more electronic device assemblies thereto. Each of the raised connection assemblies includes a platform and a connector secured to the platform for receiving a threaded fastener of an electronic device assembly therein. Each platform has a first surface oriented parallel to the first surface of the base member, the first surface of the platform being raised relative to the first surface of the base member. The raised connection assemblies may be arranged on the base member in parallel rows.

Accordingly, in some embodiments, a system and method are provided for efficiently and securely mounting electronic devices. The raised connection assemblies are rigid and, therefore, may reduce rotational vibration effects on the electronic devices. Further, a captive floating fastener disposed on each of the raised connection assemblies may reduce the likelihood of cross-threading fasteners secured thereto. In addition, the present system and method for mounting electronic devices permits multiple electronic devices to be mounted within a common enclosure in an efficient manner while permitting easy access to the various electronic devices.

These and other embodiments of the present invention will be apparent to those skilled in the art from the following detailed description and the accompanying drawings.

BRIEF DESCRIPTION OF THE DRAWINGS

FIG. 2 is a front elevation view of the FIG. 1 electronic device assembly.

FIG. 3 is a top plan view of the FIG. 1 electronic device assembly.

FIG. 4 is a left side elevation view of the FIG. 1 electronic device assembly.

FIG. 5 is a right side elevation view of the FIG. 1 electronic device assembly.

FIG. 7 is an isometric view of the FIG. 6 electronic device mount assembly.

FIG. 8 is an isometric breakaway view of a portion of the FIG. 6 electronic device mount assembly.

FIG. 9 is a top plan view of the FIG. 6 electronic device mount assembly.

FIG. 10 is a rear elevation view of the FIG. 6 electronic device mount assembly.

FIG. 11 a side elevation view of the FIG. 6 electronic device mount assembly.

Features, elements, and aspects of the invention that are referenced by the same numerals in different figures represent the same, equivalent, or similar features, elements, or aspects in accordance with one or more embodiments.

DETAILED DESCRIPTION

Figure 1:
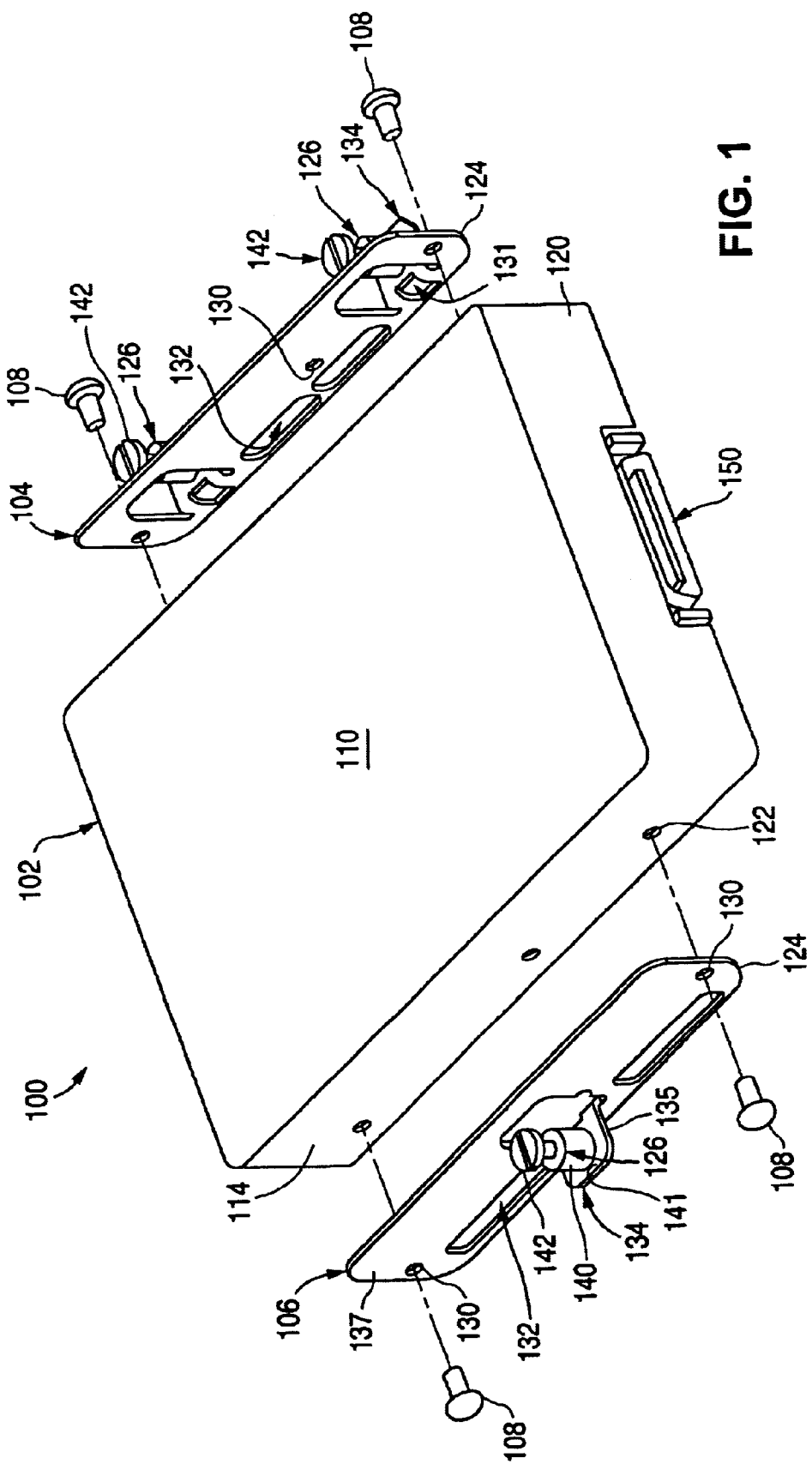
FIG. 1 is an exploded perspective view of an electronic device assembly in accordance with one embodiment of the present invention.

FIGS. 1–5 illustrate an electronic device assembly 100 in accordance with one embodiment of the present invention. The electronic device assembly 100 generally includes an electronic device 102, brace assemblies 104 and 106, and fasteners 108. The electronic device 102 may comprise any of a variety of electronic devices, such as data processing devices, data storage devices, and the like. Example data storage devices include, optical drives, CD drives, floppy disk drives, high-density disk drives, or the like. The exemplifying electronic device 102 illustrated in FIGS. 1–5 comprises a rectangular housing having a top surface 110, a bottom surface 112 (FIG. 2), side surfaces 114 and 116 (FIG. 3), a rear surface 118 (FIG. 3), and a front surface 120 (FIG. 2). Holes 122 (FIG. 1) are formed in the electronic device 102 through the side surfaces 114 and 116 to permit securing the brace assemblies 106 and 104, respectively, to the electronic device 102 with the fasteners 108.

As shown, the brace assembly 106 includes a brace 124 and a captive fastener 126. The brace 124 may be formed from a sheet of metal (such as aluminum or steel), polymer (such as plastic), or other suitable material by a stamping, molding, or other suitable formation operation. The brace 124 includes holes 130 and 132, which may be formed in the same formation operation in which the brace 124 is formed or in a subsequent operation. The brace 124 may be mounted to the electronic device 102 by securing fasteners 108 through corresponding holes 130 of the brace 124 and holes 122 of the electronic device 102. In one embodiment, the holes 122 of the electronic device 102 are tapped and the fasteners 108 are threaded to permit the fasteners 108 to be secured to the electronic device 102 in a threaded engagement. Optionally, the fasteners 108 comprise rivets for securing the brace 124 to the electronic device 102. In one embodiment, the brace 124 has a thickness of about 1.3 millimeters (about 0.05 inches).

The brace 124 also includes an arm 134. The arm 124 may be integrally formed with the brace 124 and may extend away from the electronic device 102. In one embodiment, the peripheral edges 135 of the arm 134 are cut in the brace 124 during the same formation operation in which the brace 124 is formed. The arm 134 is subsequently bent until a top surface 141 of the arm 134 is oriented substantially perpendicular to a side surface 137 of the brace 124. A hole 131 (FIGS. 4 and 5) may be formed adjacent the arm 134 and opposite the edges 135 to facilitate bending the arm 134 away from the side surface 137 to the position illustrated in FIGS. 1–5.

The captive fastener 126 is mounted on the arm 134. In one embodiment, the captive fastener 126 includes a cylindrical boss 140 mounted on the top surface 141 of the arm 134. The cylindrical boss 140 may be mounted on the arm 134 by swaging or other suitable operation. That is, the cylindrical boss 140 may be swaged into a hole (not shown) formed in the top surface 141 of the arm 134 and extending through the arm 134. A threaded fastener 142 may be provided. In one embodiment, the threaded fastener 142 is held in captive fashion in the cylindrical boss 140. Thus, movement of the threaded fastener 142 along a longitudinal axis of the threaded fastener 142 is limited by the cylindrical boss 140 to prevent the threaded fastener 142 from becoming separated from the cylindrical boss 140.

The brace assembly 104 may be identical to the brace assembly 106, except as follows. The brace assembly 104 has a pair of arms 134 formed therein. Each of the arms 134 of the brace assembly 104 also may be provided with a fastener 126, which may be captively mounted thereon. In addition, the holes 132 of the brace assembly 104 are formed between the pair of arms 134.

The holes 132 formed in the brace assemblies 104 and 106 permit passage of air from adjacent the bottom surface 112 of the electronic device 102 through the holes 132, and vice versa, to help cool the electronic device 102. The electronic device 102 also includes a connector 150, such as an SCA (Single Connector Attachment) plug adjacent the front surface 120, for connecting the electronic device 102 to a printed circuit board or other peripheral device.

FIGS. 6–10 illustrate an electronic device mount assembly 600 in accordance with one embodiment of the present invention. As depicted, the electronic device mount assembly 600 includes electronic device assemblies 100 mounted on an enclosure 602.

The enclosure 602 includes a base portion 604 having opposing first and second surfaces 606 and 608, a wall 610, and a folded flange 612. In one embodiment, the enclosure 602 is formed from a sheet of cold-rolled steel having a thickness of about 1.5 millimeters (0.06 inches). In other embodiments, the enclosure 602 can be formed of other suitable materials (e.g., aluminum or polymer) by any of a variety of suitable processes (e.g., molding).

In one embodiment, the folded flange 612 may be integrally formed with the base portion 604 of the enclosure 602. For example, the flange 612 can be formed by bending an end section of the enclosure 602 opposite the wall 610 by about 180 degrees. The folded flange 612 provides a smooth rear edge and additional rigidity for the enclosure 602. In one embodiment, the wall 610 is formed by bending an end section of the enclosure 602 opposite the folded flange 612 by about 90 degrees such that the wall 610 and the first surface 606 of the base portion 604 are orthogonal to each other. The flange 612 is oriented orthogonal to the wall 610 and includes tabs 614, which extend therefrom.

A printed circuit assembly (PCA) 620 may be mounted on the wall 610, for example, by fasteners 622. The printed circuit assembly 620 includes connectors 624 for mating with the connectors 150 (FIG. 1) of the electronic device assemblies 100. In one embodiment, each connector 624 comprises an SCA (Single Connector Attachment) connector commonly used for connecting to peripheral devices, such as electronic device 102, which may comprise a disk drive. The printed circuit assembly 620 electrically connects the electronic devices 102 with external devices, such as via a daughter card (not shown). The tabs 614 may be positioned adjacent the connectors 624 to protect the connectors 624. Guards 625 may extend from the printed circuit assembly 620 adjacent opposite ends of the connector 624 to protect the connector 624.

The electronic device assemblies 100 can be secured to the enclosure 602 at receiving assemblies 630. In one embodiment, the receiving assemblies 630 each comprise a raised member 632 (FIG. 8) and a connector 634 secured to the raised member 632 for receiving one of the threaded fasteners 142.

In the embodiment illustrated in FIGS. 6–12, each raised member 632 comprises a platform 636 and an arm 638. The platform 636 and arm 638 may be formed integrally with each other and with the base portion 604 of the enclosure 602. The arm 638 extends away from the first surface 606 of the base portion 604 and supports the platform 636 such that a first surface 640 of the platform 636 is raised relative to, and lies in a plane different from, the first surface 606 of the base portion 604. The first surface 640 of the platform 636 faces in a same direction as, and may be oriented substantially parallel with, the first surface 606 of the base portion 604.

Each of the receiving assemblies 630 may also include a hole 642 (FIG. 8) formed through the first surface 640 and extending through the associated platform 636. The hole 642 may define a longitudinal axis that is substantially perpendicular to the first surface 640 of the platform 636. The hole 642 is sized to accommodate the insertion of the connector 634 therein. In one embodiment, the connector 634 may be secured to the platform 636 by swaging the connector 634 into the hole 642. The connector 634 may comprise a threaded connector and has a tapped hole 644 formed longitudinally through the connector 634 to receive one of the threaded fasteners 142 in a threaded engagement therein. The connector 634 may be swaged into the hole 642 or may be connected to the platform by other conventional means, such as by adhesion, a press-fit connection, or the like.

In one embodiment, the connector 634 comprises a captive floating nut. The captive floating nut may comprise a housing that is secured to the bottom surface of the platform 636, such as by swaging, and a tapped floating member movably disposed in the housing to permit movement of the tapped floating member relative to the housing and to the platform 636. Since the tapped floating member is movable relative to the platform 636, one of the threaded fasteners 142 may be secured in the tapped portion thereof with a reduced likelihood of cross-threading or misalignment.

In one embodiment, the platform 636 and the arm 638 are cut from the base portion 604 of the enclosure 602 during a stamping operation. Subsequently, the platform 636 and arm 638 are formed by cutting away a portion from the first surface 606 to create a hole 646 and bending to create the platform 636 and the arm 638.

The receiving assemblies 630 are arranged on the base portion 604 of the enclosure 602 in a series of substantially parallel rows. In one embodiment, there are three receiving assemblies 630 in each of the parallel rows and each row is oriented perpendicular to the wall 610. A electronic device assembly 100 is positioned between adjacent pairs of the parallel rows with the threaded fasteners 142 aligned with the holes 644 of the connectors 634, which may comprise captive floating nuts, formed on the platforms 636 of the receiving assemblies 630. The connector 150 (FIG. 1) mates with the connector 624.

Adjacent electronic device assemblies 100 may mount on a common row of receiving assemblies 630. In this case, at least one threaded fastener 142 of the brace assembly 106 of one of the adjacent electronic device assemblies 100 is aligned with at least one of the receiving assemblies 630 in the common row. At least one threaded fastener 142 of the brace assembly 104 of the other of the adjacent electronic device assemblies 100 is aligned with at least one of the receiving assemblies 630.

Figure 6:
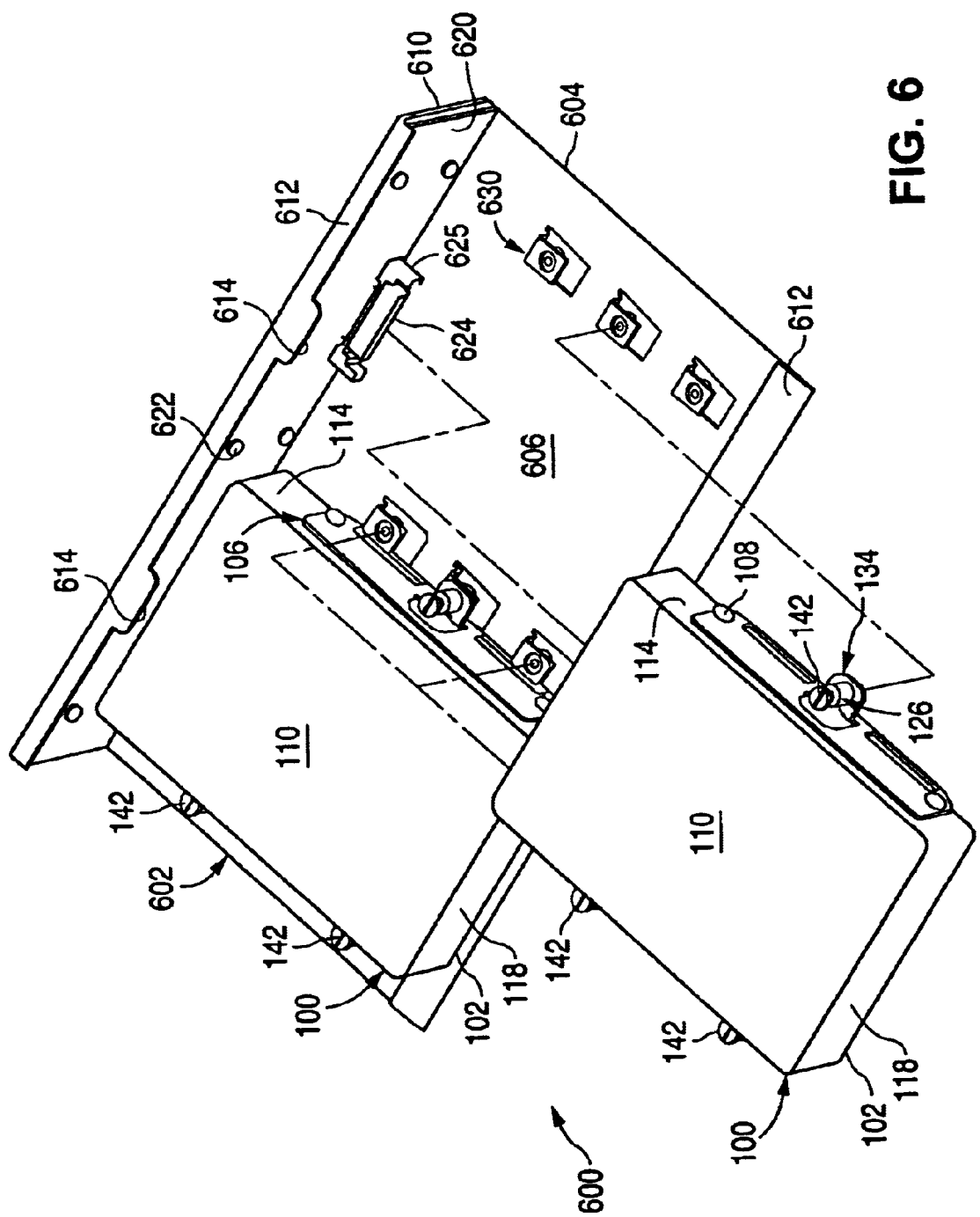
FIG. 6 is an exploded isometric view of an electronic device mount assembly in accordance with one embodiment of the present invention.

As shown in FIGS. 6, 7, and 9, for example, the adjacent electronic device assemblies 100 are secured to a common (i.e., the middle) of the three rows of receiving assemblies 630. In this example, one threaded fastener 142 of one of the electronic device assemblies 100 is aligned with one of the receiving assemblies 630 of the common row and two threaded fasteners 142 of the other of the electronic device assemblies 100 are aligned with two of the receiving assemblies 630 of the common row. This configuration permits the electronic devices 102 to be mounted to the enclosure 602 close together to efficiently use the first surface 606 of the enclosure 602.

With the threaded fasteners 142 aligned with associated connectors 634 of corresponding receiving assemblies 630, the threaded fasteners 142 may then be threaded into the associated connectors 634 to secure the associated electronic device assemblies 100 to the enclosure 602.

The receiving assemblies 630 are rigid and, as such, limit rotational vibrations associated with the associated electronic device 102. Thus, in one embodiment, a resonant frequency of the enclosure 602 is significantly higher than that of the electronic device 102, thereby preventing or reducing the rotational vibration of the electronic device 102. In addition, in embodiments where the connector 634 comprises a captive floating nut, the connector 634 has a reduced likelihood of being cross-threaded or misaligned with the threaded fastener 142.

Further, since the platforms 640 are raised relative to the first surface 606 of the base portion 604 of the enclosure 602, the platforms 640 help maintain the electronic devices 102 raised relative to the first surface 606 of the base portion 604. The raised position of the electronic devices 102 permits cooling air to pass between the first surface 606 of the enclosure 602 and the second surface 112 of the electronic devices 102 and the first surface 606 of the base portion 604 to dissipate heat generated by the electronic devices 102. This cooling air may pass, for example, through the holes 132 (FIG. 1) formed in the braces 124.

This disclosure describes exemplary embodiments of the present invention. The scope of the present invention is not limited by these exemplary embodiments. Numerous variations, whether explicitly provided for by the specification or implied by the specification, may be implemented by one of skill in the art in view of this disclosure.

What is claimed is:

1. A electronic device mount assembly, comprising:
   a first pair of braces, each having at least one fastener mounted thereon;
   one of the first pair of braces operable to be secured to a first side of a first electronic device and the other of the first pair of braces being operable to be secured to a second side of the first electronic device;
   a base member including a first surface and raised connection assemblies operable to receive the fasteners of the first pair of braces, for securing the first electronic device to the base member.

2. The electronic device mount assembly of claim 1, further comprising:
   a second pair of braces, each having at least one fastener mounted thereon;
   one of the second pair of braces operable to be secured to a first side of a second electronic device and the other of the second pair of braces being operable to be secured to a second side of the second electronic device;
   the raised connection assemblies of the base member operable to receive the fasteners of the second pair of braces for securing the second electronic device to the base member.

3. The electronic device mount assembly of claim 1, further comprising a printed circuit assembly secured to the base member, the first electronic device being electrically connected to the printed circuit assembly.

4. The electronic device mount assembly of claim 1, wherein the raised connection assemblies are arranged in rows, the first electronic device being connected between adjacent rows of the raised connection assemblies.

5. The electronic device mount assembly of claim 1 wherein each of the raised connection assemblies comprises a raised platform oriented parallel to the first surface of the base member.

6. The electronic device mount assembly of claim 1 wherein each of the raised connection assemblies further comprises:
   a raised platform oriented parallel to the first surface of the base member;
   a connector secured to the raised platform for receiving one of the fasteners therein.

7. The electronic device assembly of claim 6 wherein the connector comprises a captive floating nut.

8. The electronic device mount assembly of claim 1, further comprising an arm extending from each of the first pair of braces, wherein each fastener is mounted on an associated arm for securing the associated brace to the base member.

9. The electronic device mount assembly of claim 1, wherein each fastener comprises a captive fastener.

10. A electronic device mount assembly, comprising:
   a first pair of braces, each having at least one fastener mounted thereon;
   one of the first pair of braces operable to be secured to a first side of a first electronic device and the other of the first pair of braces being operable to be secured to a second side of the first electronic device;
   a base member including a first surface and raised connection assemblies operable to receive the fasteners of the first pair of braces, for securing the first electronic device to the base member;
   a second pair of braces, each having at least one fastener mounted thereon;
   one of the second pair of braces operable to be secured to a first side of a second electronic device and the other of the second pair of braces being operable to be secured to a second side of the second electronic device;
   the raised connection assemblies of the base member operable to receive the fasteners of the second pair of braces for securing the second electronic device to the base member;
   wherein the raised connection assemblies are arranged in rows and wherein the fastener of one of the first pair of braces and at least one of the fasteners of the second pair of braces are secured to a single row of the raised connection assemblies.

11. An apparatus comprising:
   a base member having raised connection assemblies formed thereon, the raised connection assemblies being arranged in first, second, and third rows;
   a first electronic device having opposing first and second sides, the first side of the first electronic device being secured to the first row of raised connection assemblies and the second side of the first electronic device being secured to the second row of raised connection assemblies;
   a second electronic device having opposing first and second sides, the first side of the second electronic device secured to the second row of raised connection assemblies and the second side of the second electronic device being secured to the third row of connection assemblies.

12. The apparatus of claim 11, wherein the first and second electronic devices are secured to the raised connection assemblies with captive fasteners.

13. The apparatus of claim 12 wherein each of the raised connection assemblies comprises:
   a raised platform oriented parallel to an adjacent top surface of the base member;
   a connector secured to the raised platform for receiving one of the captive fasteners therein.

14. The apparatus of claim 13, wherein the connector comprises a captive floating nut.

15. The apparatus of claim 11, wherein each of the raised connection assemblies comprises a raised platform oriented parallel to an adjacent top surface of the base member.

16. An enclosure for mounting electronic devices thereon, the enclosure comprising:
   a base member having a first surface and a wall, the wall in orthogonal relationship to the first surface of the base member;
   an adapter attached to the wall for connecting to an electronic device mounted on the enclosure;
   raised connection assemblies disposed on the base member, each of the raised connection assemblies including:
      a platform having a first surface oriented parallel to the first surface of the base member, the first surface of the platform being disposed in a different plane than the first surface of the base member;
      a connector attached to the platform for receiving a threaded fastener therein for securing the electronic device.

17. The enclosure of claim 16, wherein the raised connection assemblies are positioned in parallel rows, each row comprising a plurality of the raised connection assemblies.

18. The enclosure of claim 16, further comprising a tab formed on the wall adjacent the adapter.

19. The enclosure of claim 16 wherein the electronic device comprises a data storage device.

20. The enclosure of claim 16, wherein the connector comprises a captive floating nut.

21. The enclosure of claim 16, wherein the adapter further comprises an SCA (Single Connector Attachment) adapter.

22. A electronic device assembly comprising:
   a first brace operable to be secured to a first side of an electronic device and a second brace operable to be secured to a second side of the electronic device;
   the first and second braces each having at least one arm extending therefrom;
   a first captive fastener mounted on the arm of the first brace and a second captive fastener mounted on the arm of the second brace for securing the first and second braces to an enclosure;
   wherein the arm of the first brace further comprises a first surface, wherein the first surface of the arm is oriented orthogonal to the first surface of the electronic device, the first captive fastener being mounted on the first surface of the arm of the first brace.

23. The electronic device assembly of claim 22, wherein each arm is formed integrally with the associated brace.

24. The electronic device assembly of claim 22, wherein the electronic device further includes top and bottom surfaces, a top edge of the first brace being disposed between the top and bottom surfaces of the electronic device and a bottom edge of the first brace being disposed below the bottom surface of the electronic device.

25. The electronic device assembly of claim 22, wherein the first brace comprises a single arm and the second brace comprises at least two arms, the second captive fastener mounted on the one arm of the second brace and a third captive fastener mounted on another arm of the second brace.

* * * * *